United States Patent [19]

Nounen et al.

[11] Patent Number: 5,136,156
[45] Date of Patent: Aug. 4, 1992

[54] PHOTOELECTRIC SWITCH

[75] Inventors: Michiyasu Nounen; Kouichi Taketoshi; Yoshihiro Uragata, all of Hyogo, Japan

[73] Assignee: Mitsubishi Denki Kabushiki Kaisha, Tokyo, Japan

[21] Appl. No.: 624,464

[22] Filed: Dec. 10, 1990

Related U.S. Application Data

[63] Continuation of Ser. No. 412,984, Sep. 26, 1989, abandoned.

[30] Foreign Application Priority Data

Nov. 1, 1988 [JP] Japan .................. 63-277997

[51] Int. Cl.⁵ .............................. G01V 9/04
[52] U.S. Cl. .................. 250/221; 250/222.1
[58] Field of Search .................. 250/221, 222.1; 340/555, 556, 557, 706, 712; 341/20, 31

[56] References Cited

U.S. PATENT DOCUMENTS

| | | | |
|---|---|---|---|
| 3,234,512 | 2/1966 | Burkhardt | 250/221 |
| 3,746,863 | 7/1973 | Pronovost | 250/221 |
| 3,764,813 | 10/1973 | Clement et al. | 250/221 |
| 4,198,623 | 4/1980 | Misek | 340/712 |
| 4,703,316 | 10/1987 | Sherbeck | 250/221 |

FOREIGN PATENT DOCUMENTS 0330767 9/1989 European Pat. Off. .
2344066 10/1977 France .

Primary Examiner—David C. Nelms
Attorney, Agent, or Firm—Burns, Doane, Swecker & Mathis

[57] ABSTRACT

An improved photoelectric switching device for coordinate detection system comprises a first array of light emitting elements, a first array of photo-detecting elements for receiving the light from the first array of light emitting elements and producing a first block signal when the light is blocked by a stylus, such as a finger, a second array of light emitting elements, a second array of photo-detecting elements for receiving the light from the second array of light emitting elements and producing a second block signal when the light is blocked by the stylus wherein the light receiving surfaces of the second array of photo-detecting elements are aligned an angle, such as 180 degrees, with respect to those of the first array of photo-detecting elements, and a control means such as a microcomputer for driving the first and the second array of the light emitting elements and for discriminating the coordinates of the stylus on the display unit which displays a pattern having several regions allocated for certain control of optional equipment. Therefore, the stylus can be detected even if there is an inadvertent operation in either of the first and the second photo-detecting elements due to a strong incidence of ambient light in the lateral direction.

9 Claims, 4 Drawing Sheets

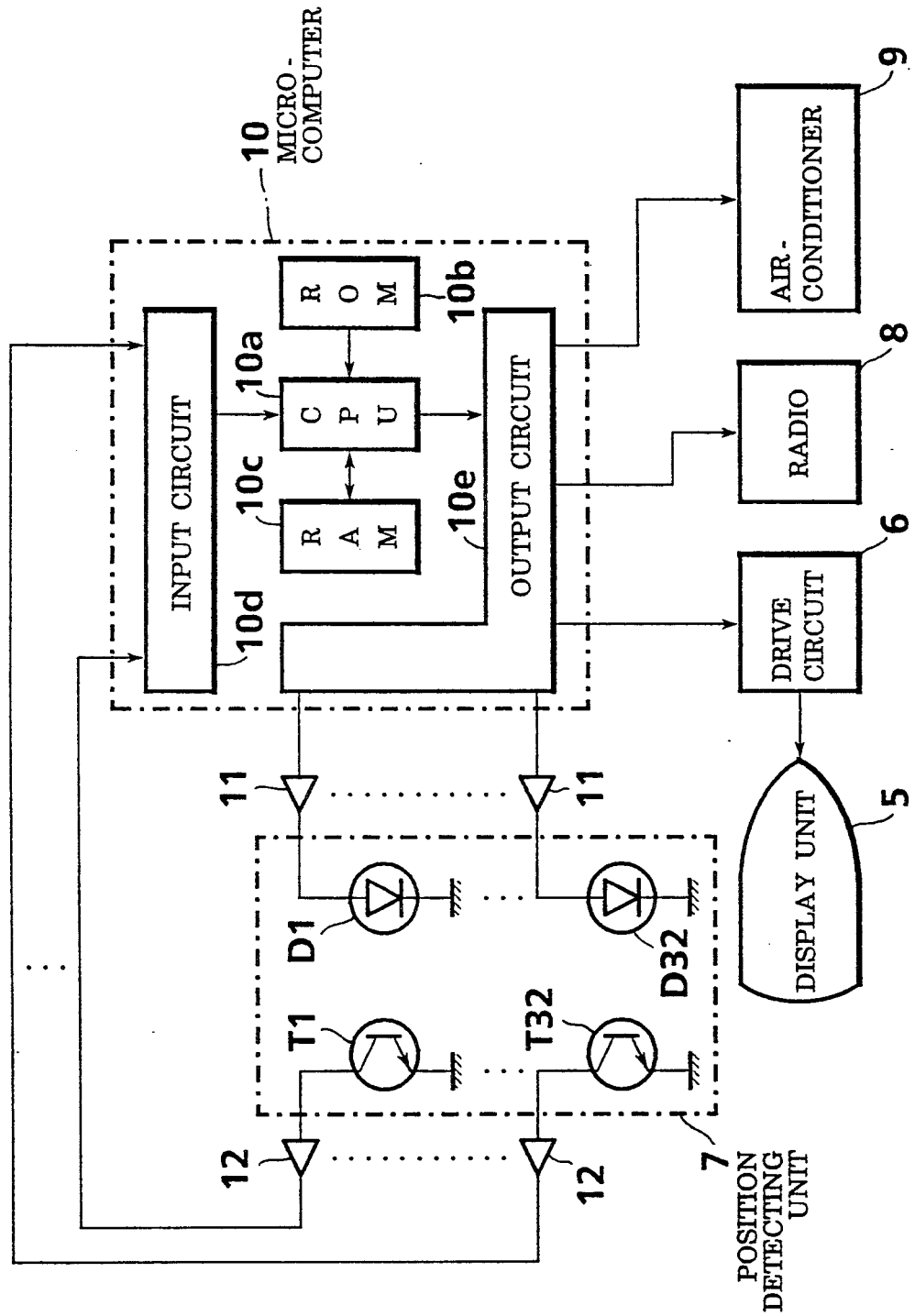

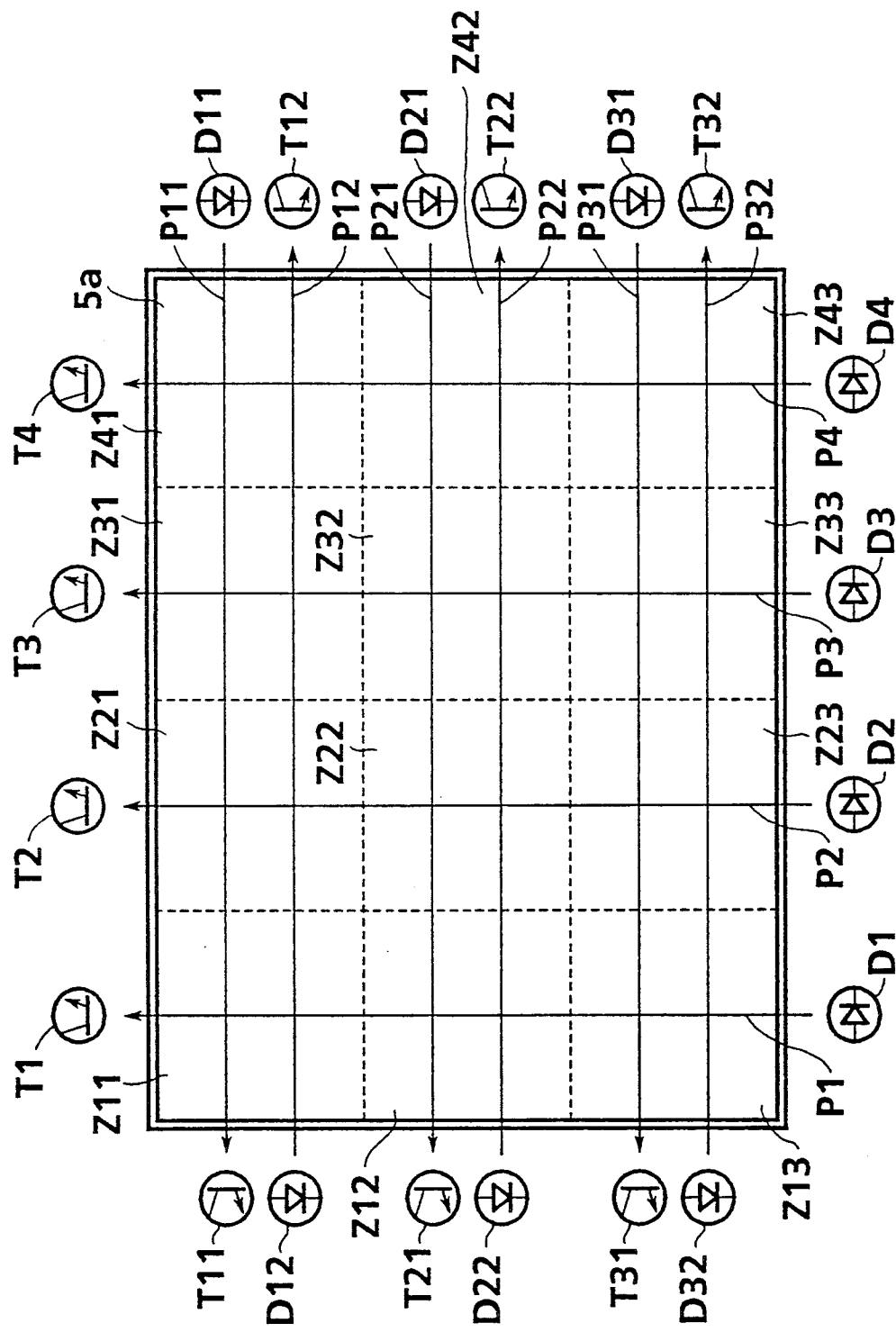

PHOTOELECTRIC SWITCH

This application is a continuation, of application Ser. No. 07/412,984, filed Sept. 26, 1989, now abandoned.

BACKGROUND OF THE INVENTION

1. Field of the Invention

The present invention relates to a photoelectric switching device for a coordinate detection system and, more particularly, to such a photoelectric switching device for a coordinate data input device, a so called touch panel, to be installed in adjacent to an associated CRT (Cathode Ray Tube) display unit and the like.

2. Description of the Prior Art

Japanese Laid-open Patent No. 61,224/1987 discloses an arrangement such as that shown in FIG. 1, wherein 1 denotes a liquid crystal display unit, 2a, 2a denotes two mutually perpendicular linear arrays of infrared light-emitting elements or light emitting diodes for emitting infrared light along the lateral and longitudinal light paths, respectively, 3a, 3a denotes two mutually perpendicular linear arrays of associated photo-detector elements for detecting infrared light from respective light emitting diodes, and 4 denotes a user's finger placed on the face of display unit in such a manner as to block the infrared light along the lateral and longitudinal light paths A and B being emitted from the light-emitting diodes.

According to this system, each light emitting element 2a emits light one by one in a sequential manner under the control of control circuitry (not shown) and each associated photo-detector element 3a receives the light one by one in the same manner. If the light path A in the lateral direction and the light path B in the longitudinal direction are blocked respectively by a finger, for instance, the photo-detector elements 3a that correspond to the light paths A and B will produce a signal for indicating obstruction of the light paths. The control circuitry will then locate the spatial coordinates of the finger 4 by discriminating the sources of the signals produced by the photo-detector elements. Therefore, various operations such as change of display, control of optional equipment being installed, and the like are carried out by detecting the spatial coordinates of the finger 4 on a pattern (not shown) to be displayed on the face of display unit 1 for entering a switching input.

Such a prior art coordinate detection system has been installed in an instrument panel of an automobile for controlling a car audio system, an air conditioner and the like. In such a prior art system, the photo-detector elements arranged in the longitudinal direction along the light path B are normally installed at the upper portion of the display unit 1 for eliminating inadvertent operations to be caused by the ambient light such as the sun light. The detectors that conforms to the lateral direction along the light path A are installed at the left side of the display unit 1 for decreasing the influence of ambient light to a greater extent in the prior art system under such condition as the coordinate detection system is installed at the central part, between a driver's seat and the passenger seat, of the instrument panel. This is because ambient light from the driver's side is usually effectively blocked by a driver since the driver always occupies driver's seat at the right side in case of the right-hand steering-wheel vehicle however, it is hard to prevent ambient light from the passenger side from reaching the right side of the display unit 1 if no one is on the passenger seat.

Accordingly, in the prior art system, it has been difficult to avoid inadvertent operations merely by installing the photo-detecting elements at the left side of the display unit 1 even though ambient light from the driver's side is substantially blocked by the driver.

It is, therefore, a principal object of the present invention to eliminate the aforesaid difficulties and to provide a photoelectric switching device for coordinate detection systems having less susceptibility to inadvertent operations caused by ambient light.

SUMMARY OF THE INVENTION

According to the present invention, a photoelectric switching device for a coordinate detection system comprises a first array of light emitting elements, a first array of photo-detecting elements for receiving the light from said first array of light emitting elements and producing a first block signal when the light is blocked by an object, a second array of light emitting elements, a second array of photo-detecting elements for receiving the light from said second array of light emitting elements and producing a second block signal when the light is blocked by the object, wherein the light receiving surfaces of the second array of photo-detecting elements are aligned in a different angle from those of the first array of photo-detecting elements, and a control means for driving said first and second arrays of light emitting elements and for producing a final detection signal indicating coordinate information of the object on the surface of the display unit when either said first or second detection signal is derived from said first and second arrays of photo-detecting elements.

According to the specific embodiment of this invention, the light receiving surfaces of the first and second arrays of photo-detecting elements are aligned at a different angle with respect to each other and the control means derives a detected information signal upon receipt of either said first or second detect signal. Therefore, the presence of an object can effectively be detected by the arrangement according to the invention even if either the first or second array of photo-detecting elements is exposed to ambient light.

BRIEF DESCRIPTION OF THE DRAWINGS

FIG. 2 is a block diagram of an embodiment of this invention;

FIG. 3 is an enlarged showing of an object detecting unit; and

DESCRIPTION OF THE PREFERRED EMBODIMENT

Figure 1:
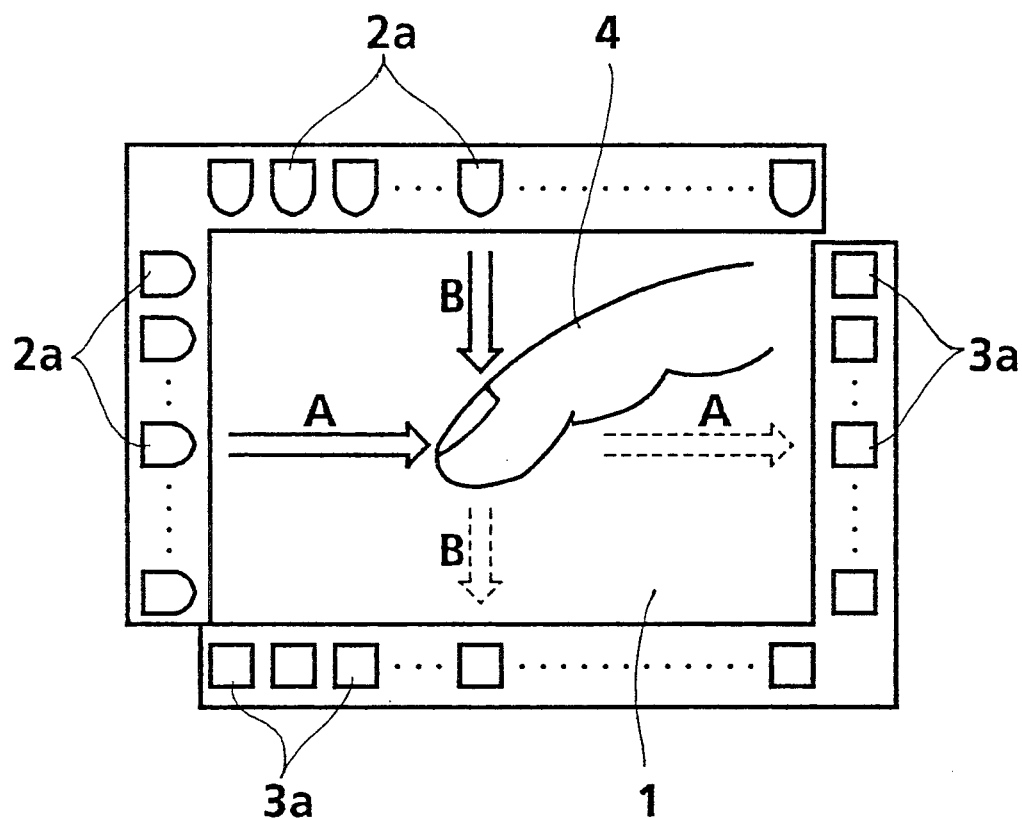
FIG. 1 is a schematic diagram of the prior art system.

The present invention will now be described in more detail with reference to the accompanying drawings. Referring now to FIG. 2, there is shown a block diagram of the present invention, wherein 5 designates a display unit including a CRT tube of the type installed in an instrument panel (not shown) between the driver's seat and the passenger seat, which is the same installation as the prior art system for the right-hand steering-wheel vehicles as described in the above, 6 designates a driving circuit for the display unit 5, and 7 is a position detecting unit (which will be described with reference to FIG. 3 hereinafter) installed at the periphery of the display unit 5 in a similar manner to the prior art for detecting the spatial location of a user's finger. In addition, 8 and 9 are a radio and an air conditioner, respectively, and 10 denotes a microcomputer including a CPU 10a, RAM 10c, an input circuit 10d, and an output circuit 10e for the control of the driving circuit 6, the position detecting unit 7, the radio 8 and the air conditioner 9.

FIG. 3 shows an enlarged diagram for illustrating the position detecting unit 7, in which 5a denotes a display of the display unit 5. The display 5a is divided into 12 regions Z11–Z43 provided by 3 regions in longitudinal and 4 regions in lateral directions, as shown by dotted lines in the drawing. By assigning X1 through X4 for lateral coordinates and Y1 though Y3 for longitudinal coordinates, for ease of understanding, a position on the display will be specified by coordinates (Xi, Yj) (where i=1, 2, 3, 4, and j=1, 2, 3) as shown in the drawing. D1 through D4 are light emitting elements consisting of infrared light emitting diodes mounted on the lower side of the display unit 5. They emit infrared light upwards respectively along light paths designated by P1 through P4. T1 through T4 are photo-detecting elements in the form of photo-transistors mounted on the upper side of the display unit 5 for receiving the light from the light emitting elements D1 through D4 and for generating a block signal if any one of the light paths P1 through P4 is blocked by a finger. D11, D21 and D31 constitute a first array of light emitting elements consisting of infrared light emitting diodes which are mounted on the right side (driver's seat side) of the display unit 5 for providing light paths P11, P21 and P31 by transmitting light towards the left side of the display 5a. T11, T21 and T31 constitute a first array of photo-detecting elements consisting of photo-transistors which mounted at the left side (passenger seat side) of the display 5a for receiving the light from the first array of light emitting elements and generating a first block signal when either of the light paths P11, P21 and P31 is blocked by a finger.

D12, D22 and D32 constitute a second array of light emitting elements consisting of infrared light emitting diodes for providing light paths P12, P22 and P32 by transmitting the light towards the right side of the display 5a. T12, T22 and T32 constitute a second array of photo-detecting elements in the form of photo-transistors which are mounted on the right side of the display 5a for receiving the light from the second light emitting elements D12, D22 and D32 and generating a second block signal when either of the light paths P12, P22 and P32 is blocked by a finger. The light path P1 passes through the regions Z11, Z22 and Z23, while the light path P2 passes through the regions Z21, Z22 and Z23, the light path P3 through the regions Z31, Z32 and Z33, and the light path P4 through the regions Z41, Z42 and Z43. On the other hand, the light paths P11 and P12 pass through the regions Z11, Z21, Z31 and Z41 simultaneously in the opposite directions, similarly, the light paths P21 and P22 through the regions Z12, Z22, Z32 and Z42, and the light paths P31 an P32 through the regions Z13, Z23, Z33 and Z43 respectively.

Further, every light emitting element (D1 and others) is driven by the microcomputer 10 through an amplifier 11 and every photo-detector (T1 and others) is connected to the microcomputer through an amplifier 12 for the transmission of each block signal as shown in FIG. 2.

In accordance with the embodiment illustrated in the above, the regions Z11–Z43 in the display 5a of the display unit 5 are assigned to display specific patterns (not shown) such as channel selection buttons, volume control buttons and the like for the operation of the radio 8. With this arrangement, if a user's finger is placed on a pattern which indicates a desired operation, for instance the region Z11, the longitudinal light path P1 and the lateral light paths P11 and P12 will be blocked entirely by the finger and the photo-detector elements T1, T11 and T12 will produce block signals that correspond to the required operation. The microcomputer 10 discriminates, by receiving the derived block signals, the region Z11 where the longitudinal light path P1 and the lateral light paths P11 and P12 are blocked at the same time and then controls the radio 8, for instance, based on the operating functions assigned to the region Z11. The microcomputer 10 is capable of discriminating the regions Z11, Z21, Z31 and Z41 where the lateral light paths P11 and P12 pass through even if one of the lateral light paths P11 and P12 is not blocked with a finger and only one block signal from either the first or second photo-detecting elements T11 or T12 is produced. With this capability, even when strong ambient light falls on the display 5a from the left to the right side thereof, the first photo-detecting element T11 can produce the first block signal whilst the second photo-detecting element T12 is not capable of producing a second block signal. Accordingly, the second photo-detecting element T12 can produce the second block signal without fail when strong ambient light falls on the display 5a from the right to the left side thereof. As it is described above, in the installation of the photo-electric switching device to a vehicle, since strong ambient light such as sunlight falls generally on the display 5a from the upper side to the lower side thereof, no problems result from installing the photo-detecting elements T1 through T4 only at the upper side of the display 5a.

Figure 4A:
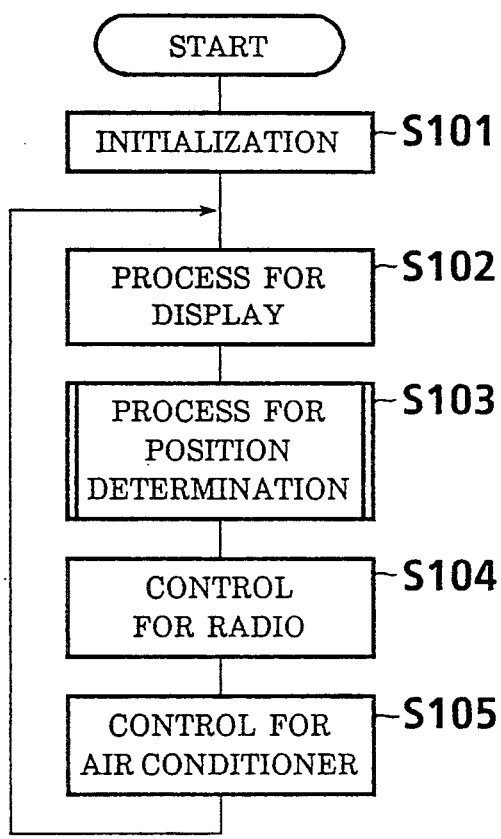
FIG. 4A and FIG. 4B are flowcharts showing the operation steps performed by the microcomputer of FIG. 1.
Figure 4B:
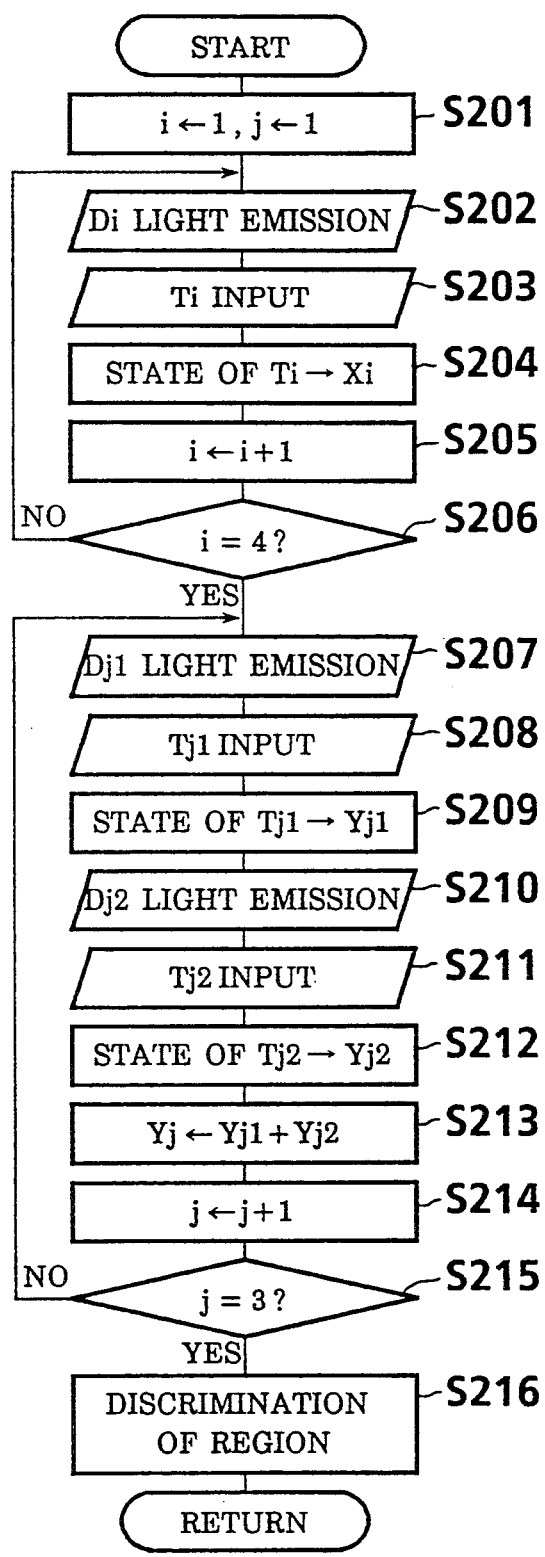

Referring now to FIGS. 4A and 4B, there are shown flowcharts implemented by the microcomputer 10 of FIG. 1. In the main flowchart of FIG. 4A, the microcomputer performs a first step S101 of initialization upon initiation of the apparatus. A display process for delivering a signal of displaying a predetermined pattern on the display unit 5 to the drive circuit 6 is performed at step S102. The control of the position detecting unit 7 is performed at step S103 and whereby carrying out the position detecting process for discriminating a region of the display 5a touched by a finger. The detailed steps of the step S103 are shown in FIG. 4B, an initial setting of parameters "i" and "j" to "1" is performed respectively at step S201 after starting the flow. Next, step S202 outputs a signal for exciting a light emitting element Di. An output signal (which indicates the existence of a block signal) of a photo-detecting element Ti is accepted at step S203 and the status of a photo-detecting element Ti is memorized on a memory Xi at step S204 whereby, "1" is memorized if there is an output from the photo-detecting element Ti and "0" if there is not. Step S205 increments a parameter "i" to "i+1" and the program returns from S206 to S202 until the parameter becomes 4 by the repeating of steps S202-S205. With this arrangement, the status of blocking in any of the four light paths P1–P4 along the longitudinal direction of the display 5a is memorized adequately.

A first light emitting element Dj1 is excited to emit light at step S207. An output (which indicates the existence of the first block signal) of a first photo-detecting element Tij is accepted at step S208 and the status of the first photo-detecting element Tij is memorized on a memory Yj1 at step S209 whereby, "1" is memorized if there is an output from the first photo-detecting element Tj1 and "0" if there is not. In a similar manner, a second light emitting element Dj2 is excited to emit light at S210, an output (which indicates the existence of a second block signal) of a photo-detecting element Tj2 is accepted at step S211 and the status of the second photo-detecting element Tj2 is memorized on a memory Yj2 at step S212 whereby, "1" is memorized if there is an output from the second photo-detecting element Tj2 and "0" if there is not. Step S213 performs disjunction of memories Yj1 and Yj2 and the resultant is memorized on a memory Yj. Step S214 increments a parameter "j" to "j+1" and the program returns from S215 to step S207 until the parameter j becomes 3 by repeating the steps of S207–S215.

The discrimination of the region touched by the finger is performed at step S216 based on the contents of the memories Xi and Yj, that is, if the contents of the memories Xi and Yj are both "1" at the same time, then, the region Zij is determined to be the region touched by the finger and the program returns to the main flowchart of FIG. 4a again for carrying out the sucessive steps. S104 performs the control of the radio 8, for instance, increasing the volume thereof, if the pattern corresponding to the region being discriminated at step S216 indicated such an operation. Step S105 performs the control of the air conditioner 9, for instance, increasing a setting temperature, if the pattern denotes an operational instruction for the air conditioner 9. In this way, the steps S102–S105 are performed repeatedly.

As described above, according to the embodiment, it is required to detect blockage of one light path P1 in the longitudinal direction of the display 5a for discriminating the region Z11 touched by the finger. However an object detected signal (the content of the memory Yj at step S213 corresponds to this signal in FIG. 4b) which indicates the presence of the finger in the lateral direction of the display 5a is also required provided that either one of the first block signal or the second block signal is derived from the respective photo-detectors after detecting either one of the two lateral light paths P11 and P12 being blocked. In other words, since the first and the second photo-detectors T11 and T12 being related to the light paths P11 and P12 are so aligned at a predetermined angle to each other (180 degrees for this embodiment), the partial position 2 of the finger on the display 5a can be reliably determined by performing the disjunction of the first and the second block signals even if there is a strong incidence of ambient light which results in an inadvertent operation of either one of the associated photo-detectors. This is because at least the other photo-detector operates normally since there is no incidence of ambient light thereon.

It should be appreciated from the foregoing description that the present invention provides an improved switching device for detecting a partial position of finger on the display, whereby the light receiving surfaces of second photo-detecting elements are aligned in a different angle from those of the first photo-detecting elements for deriving an object detect signal from a control means if there is either one of the first and the second block signals. Therefore, this invention has a specific feature of detecting the object even if there is an inadvertent operation in either of the first and the second photo-detecting elements due to a strong incidence of ambient light.

Although the present invention has been described in detail with reference to the preferred embodiment, it should be understood by those of ordinary skilled in the art that various modifications can be made without departing from the scope of this invention, for example, it is obvious that this invention may be applied to an automatic door the opening or closing of which is performed by detecting a human body with such an arrangement that at least one light emitting element is mounted for each first and second light emitting elements and at least one associated photo-detector is mounted for each first and second photo-detectors whereby detecting the human body when two light paths have blocked simultaneously. In addition to this, the light receiving surfaces of the first and the second photo-detectors are not really necessary to oppose face to face each other but it is enough if there is a definite angle therebetween. Accordingly, this invention is not to be limited except as by the appended claims.

What is claimed is:

1. A photoelectric switching device for a vehicle comprising:
   a first light emitting element mounted at one side of a display unit;
   a first photo-detecting element mounted at the other side of the display unit for receiving the light from said light emitting element along a first light path and producing a first block signal when the first light path is blocked by an object;
   a second light emitting element mounted at said other side of the display unit;
   a second photo-detecting element mounted at said one side of the display unit for receiving the light from said second light emitting element along a second light path parallel and in a direction opposite to said first light path and producing a second block signal when the second light path is blocked by the object; and
   a control means for driving said first and second light emitting elements and for producing a detection signal which indicates the presence of the object when either said first or second block signal is produced by said first or second photodetecting element,
   whereby a plurality of regions are displayed on said display unit for indicating operable functions and in alignment with corresponding light paths.

2. A photoelectric switching device as defined in claim 1, wherein said first and second light emitting elements comprise an array of light emitting diodes, respectively and said first and second photo-detecting elements comprise an array of photo-detecting transistors, respectively.

3. A photoelectric switching device as defined in claim 1, and further including a third light emitting element the light path of which is mutually perpendicular to that of the first and second light emitting elements and a third photo-detecting element for receiving the light from said third light emitting element and producing a block signal when the light is blocked by the object.

4. A photoelectric switching device as defined in claim 2, and further including an array of light emitting diodes mutually perpendicular to said first and second array of light emitting diodes, and a third array of photo-detecting transistors mutually perpendicular to said first and second array of photo-detecting transistors, and arranged to received light from said array of light emitting diodes except when blocked by said object.

5. A photoelectric switching device as defined in claim 4, wherein the third array of light emitting diodes is mounted at the lower side of a frame and the third array of the photo-detecting transistors is mounted at the upper side of the frame.

6. A photoelectric switching device as defined in claim 2 or 4, wherein the control means is comprises an input circuit, an output circuit, a central processing unit, a random access memory, and a read only memory.

7. A photoelectric switching device as defined in claim 1, wherein a light path of the first light emitting element and a light path of the second light emitting element are arranged to pass through the same region allocated for the control of optional equipment.

8. A photoelectric switching device as defined in claim 4, wherein a light path of one light emitting diode of the first array of light emitting diodes and a light path of one light emitting diode of the second array of the light emitting diodes are arranged to pass through the same divided region or regions allocated for the control of optional equipment.

9. A photoelectric switching device as defined in claim 1 or 4, wherein the light emitting elements emit infrared light.

* * * * *